US010658889B2

(12) United States Patent
Tran et al.

(10) Patent No.: US 10,658,889 B2
(45) Date of Patent: May 19, 2020

(54) ELECTROMAGNETIC MACHINE AND TUNABLE INSERT RING

(71) Applicant: GM Global Technology Operations LLC, Detroit, MI (US)

(72) Inventors: Xuan Q. Tran, Birmingham, MI (US); Edward L. Kaiser, Orion, MI (US); Song He, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 45 days.

(21) Appl. No.: 16/128,632

(22) Filed: Sep. 12, 2018

(65) Prior Publication Data

US 2020/0083764 A1 Mar. 12, 2020

(51) Int. Cl.
*H02K 5/24* (2006.01)
*H02K 1/18* (2006.01)
*H02K 1/20* (2006.01)

(52) U.S. Cl.
CPC ............ *H02K 1/185* (2013.01); *H02K 1/20* (2013.01); *H02K 5/24* (2013.01); *H02K 2213/09* (2013.01)

(58) Field of Classification Search
CPC ............ H02K 1/185; H02K 5/18; H02K 5/20; H02K 5/24; H02K 9/00–28
See application file for complete search history.

(56) References Cited

U.S. PATENT DOCUMENTS

| | | | | |
|---|---|---|---|---|
| 4,134,036 A * | 1/1979 | Curtiss | ................... | H02K 1/185 310/216.113 |
| 4,894,574 A * | 1/1990 | Ragaly | ................... | H02K 1/185 310/216.114 |
| 5,196,749 A * | 3/1993 | Palma | ..................... | H02K 1/185 310/216.039 |
| 5,873,710 A * | 2/1999 | Tucker | .................. | F04C 23/008 417/410.5 |
| 8,648,503 B2 * | 2/2014 | Kessler | ..................... | H02K 5/15 310/51 |
| 2004/0032177 A1 * | 2/2004 | Nitzsche | .................. | H02K 5/24 310/91 |
| 2014/0197705 A1 * | 7/2014 | Sato | ........................ | H02K 1/185 310/91 |
| 2018/0175679 A1 * | 6/2018 | Seo | .......................... | B60L 50/51 |

OTHER PUBLICATIONS https://www.bearings.saint-gobain.com/solution/renco/, accessed Feb. 1, 2017.
http://www.usatolerancerings.com/, accessed Feb. 1, 2017.

* cited by examiner

*Primary Examiner* — Ramon M Barrera
(74) *Attorney, Agent, or Firm* — Quinn IP Law

(57) ABSTRACT

An electromagnetic machine includes a motor housing defining a cavity therein, and a stator disposed within the cavity. The stator has an external surface and a plurality of mounting ears each configured to receive a fastener and extending from the external surface towards the motor housing. The assembly includes a tunable insert ring disposed between the motor housing and the stator. The tunable insert ring and the stator define at least one cooling channel therebetween. The tunable insert ring encircles the external surface and includes a plurality of projections each extending towards and disposed in contact with the stator to thereby stiffen the electromagnetic machine and minimize vibration of the stator within the motor housing. A device including the electromagnetic machine is also described.

20 Claims, 3 Drawing Sheets

ELECTROMAGNETIC MACHINE AND TUNABLE INSERT RING

INTRODUCTION

The disclosure relates to an electromagnetic machine and device.

Electromagnetic machines such as electric motors, generators, and traction motors are useful for converting energy from one form to another. Such electromagnetic machines often include an element rotatable about an axis of rotation. The rotatable element, i.e., the rotor, may be coaxial with a static element, i.e., a stator, and energy may be converted via relative rotation between the rotor and stator.

SUMMARY

An electromagnetic machine includes a motor housing defining a cavity therein, and a stator disposed within the cavity. The stator has an external surface and a plurality of mounting ears each configured to receive a fastener and extending from the external surface towards the motor housing. The electromagnetic machine also includes a tunable insert ring disposed between the motor housing and the stator. The tunable insert ring and the stator define at least one cooling channel therebetween. Further, the tunable insert ring encircles the external surface and includes a plurality of projections each extending towards and disposed in contact with the stator to thereby stiffen the electromagnetic machine and minimize vibration of the stator within the motor housing.

In one aspect, each of the plurality of projections may have a location on the tunable insert ring and a spring rate. At least one of the spring rate and the location is tunable to thereby reduce vibration of the stator within the motor housing.

The tunable insert ring may contact the motor housing and the stator with an interference fit.

In another aspect, the tunable insert ring may have four quadrants, a center, a contact surface spaced apart from the center at a first distance and configured for contacting the external surface, and a plurality of protrusions each configured for surrounding a respective one of the plurality of mounting ears. Each of the plurality of protrusions may be spaced apart from the center at a second distance that is greater than the first distance. Further, each of the plurality of protrusions may surround a respective one of the plurality of mounting ears to define the at least one cooling channel therebetween.

In a further aspect, each of the plurality of protrusions may straddle two of the four quadrants. Further, the electromagnetic machine may include three protrusions and four mounting ears.

The tunable insert ring may further include a first end disposed in a second quadrant and a second end spaced apart from the first end and disposed in a fourth quadrant.

In another aspect, the tunable insert ring may include four protrusions. The tunable insert ring may have a first end disposed in a third quadrant and the second end spaced apart from the first end and also disposed in the third quadrant.

Each of the four quadrants may include at least one of the plurality of projections. At least one of the four quadrants may include at least four projections. A first projection may be larger than a second projection. A first quadrant and a second quadrant may each include four projections. The four projections may be arranged in a diamond shape. A third quadrant and a fourth quadrant may each include five projections. The five projections may be arranged in an X shape.

In another embodiment, an electromagnetic machine includes a motor housing defining a cavity therein, and a stator disposed within the cavity. The cavity has an external surface and four mounting ears each configured to receive a fastener and extending from the external surface towards the motor housing. The electromagnetic machine also includes a tunable insert ring disposed between the motor housing and the stator. The tunable insert ring includes four quadrants, a center, a contact surface spaced apart from the center at a first distance and configured for contacting the external surface, and three protrusions each configured for surrounding a respective one of three of the four mounting ears. Each of the three protrusions is spaced apart from the center at a second distance that is greater than the first distance. Further, the tunable insert ring has a first end disposed in a second quadrant and a second end spaced apart from the first end and disposed in a fourth quadrant. The tunable insert ring surrounds the four mounting ears to define a plurality of cooling channels therebetween. The tunable insert ring encircles the external surface and includes a plurality of projections each extending towards and disposed in contact with the stator to thereby stiffen the electromagnetic machine and minimize vibration of the stator within the motor housing. A first quadrant and a second quadrant spaced opposite the first quadrant each include four projections arranged in a diamond shape. A third quadrant and a fourth quadrant spaced opposite the third quadrant each include five projections arranged in an X shape.

A device includes a driven component and an electromagnetic machine coupled to the driven component. The electromagnetic machine includes a motor housing defining a cavity therein, and a stator disposed within the cavity. The stator has an external surface and a plurality of mounting ears each configured to receive a fastener and extending from the external surface towards the motor housing. The electromagnetic machine also includes a tunable insert ring disposed between the motor housing and the stator. The tunable insert ring and the stator define at least one cooling channel therebetween. The tunable insert ring encircles the external surface and includes a plurality of projections each extending towards and disposed in contact with the stator to thereby stiffen the electromagnetic machine and minimize vibration of the stator within the motor housing. The device also includes an output member disposed within a second cavity defined by the stator and configured for driving the driven component. The stator may be concentric with the output member.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

Figure 1:
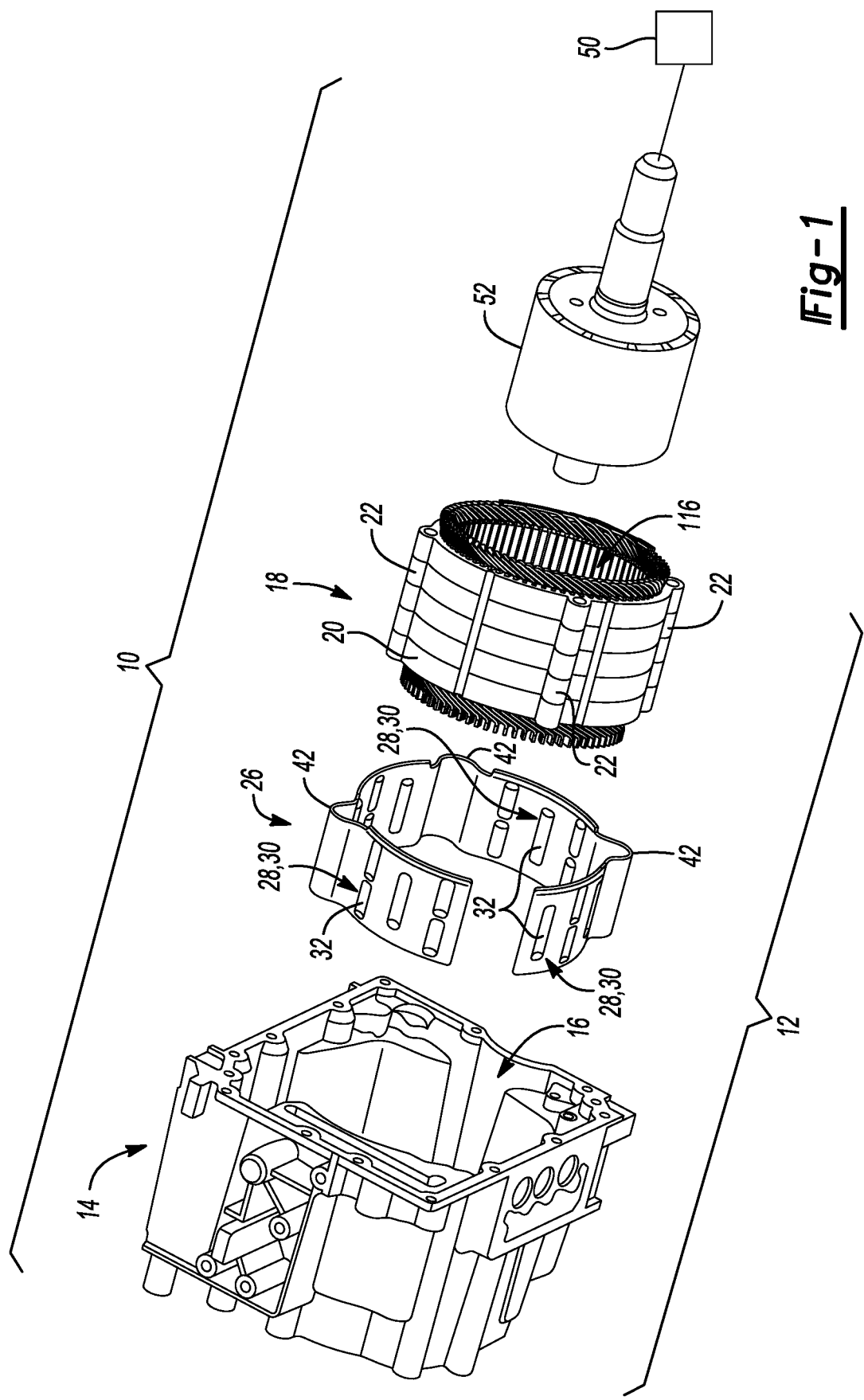
FIG. 1 is a schematic illustration of an exploded and perspective view of a device including an electromagnetic machine having a motor housing, a stator, and a tunable insert ring.

Referring to the Figures, wherein like reference numerals refer to like elements, a device 10 including an electromagnetic machine 12 is shown generally in FIG. 1. The device 10 and electromagnetic machine 12 may be useful for applications requiring excellent efficiency and minimal noise, vibration, and harshness during operation. In particular, the electromagnetic machine 12 may have excellent stiffness and therefore may not suffer from low-frequency whine and/or efficiency losses during operation. Accordingly, the electromagnetic machine 12 and device 10 may be economical in terms of manufacturing time and cost, may be scalable to mass production manufacturing operations, and may eliminate manufacturing steps such as shrink-fitting and resin-bonding of components.

As such, the device 10 and electromagnetic machine 12 may be useful for vehicular applications such as, but not limited to, automobiles, buses, forklifts, motorcycles, bicycles, trains, trams, trolleys, spacecraft, airplanes, farming equipment, earthmoving or construction equipment, cranes, tanks and transporters, boats, and the like. Alternatively, the device 10 and electromagnetic machine 12 may be useful for non-vehicular applications such as stationary power generation, residential appliances, portable power generation, electronics, computers, tools, and the like. More specifically, by way of a non-limiting example, the device 10 and electromagnetic machine 12 may be useful for electric traction motor applications for non-autonomous, autonomous, or semi-autonomous vehicle applications. That is, the device 10 may be a vehicle and the electromagnetic machine 12 may be an electric motor.

More specifically, as described with reference to FIG. 1, the electromagnetic machine 12 includes a motor housing 14 defining a cavity 16 therein, and a stator 18 disposed within the cavity 16. The motor housing 14 may be configured for supporting and protecting components of the electromagnetic machine 12 and may be formed from a comparatively rigid, formable, and lightweight material such as steel or aluminum. The motor housing 14 may have a generally square or rectangular shape and the cavity 16 may be configured for receiving the stator 18.

Figure 3:
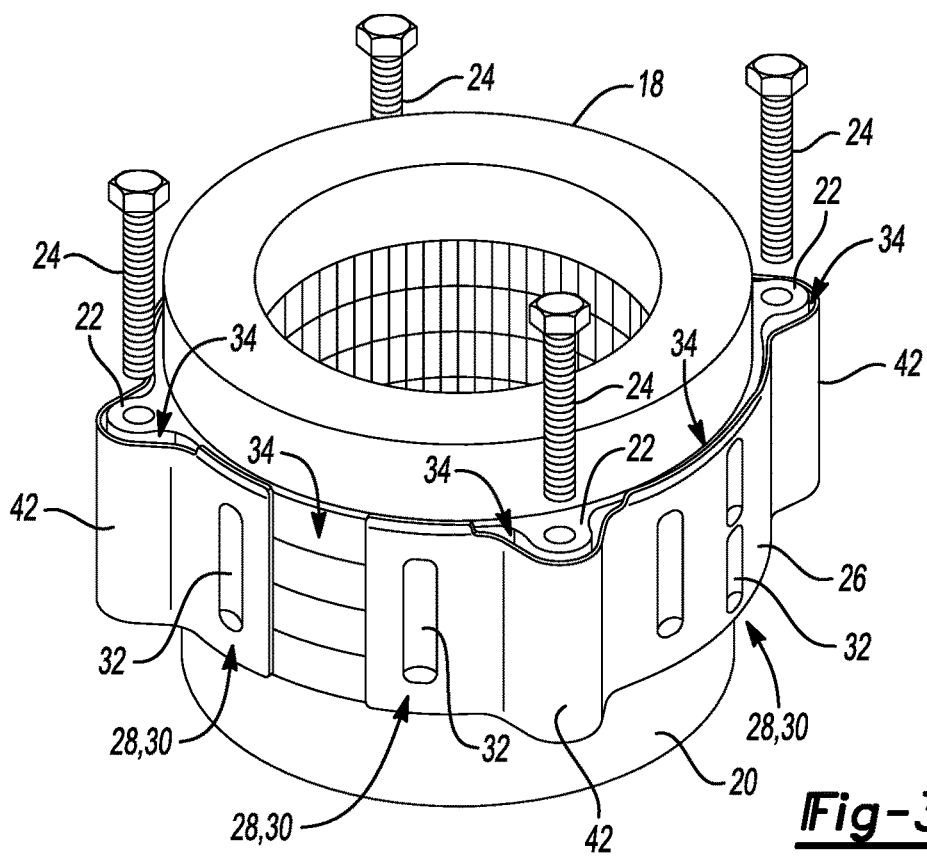
FIG. 3 is a schematic illustration of an exploded and perspective view of the tunable insert ring encircling the stator of FIG. 1.

Referring now to FIGS. 1 and 3, the stator 18 has an external surface 20 and a plurality of mounting ears 22 configured to receive a fastener 24 (FIG. 3) and extending from the external surface 20 towards the motor housing 14. For example, the stator 18 may be formed from a plurality of cylindrical and concentric steel laminations (not individually shown) stacked upon one another to thereby form the external surface 20. Each of the plurality of mounting ears 22 may be shaped as a bump-out from the external surface 20 and may be arranged to receive the fastener 24, e.g., a bolt, so as to secure the stator 18 within the cavity 16 of the motor housing 14 during assembly of the electromagnetic machine 12. In addition, the mounting ears 22 may carry a torque of the electromagnetic machine 12. The stator 18 may include any number of mounting ears 22. In one embodiment, the stator 18 may include four mounting ears 22 so as to stably attach the stator 18 to the motor housing 14 and minimize eccentric rotation of the stator 18 during operation.

As described with reference to FIGS. 1-4, the electromagnetic machine 12 further includes a tunable insert ring 26 disposed between the motor housing 14 and the stator 18. The tunable insert ring 26 may be useful for minimizing noise, vibration, and harshness of the electromagnetic machine 12 during operation. In particular, as set forth in more detail below, the tunable insert ring 26 may contact both the stator 18 and the motor housing 14 at selectable locations 28 with a controllable spring rate 30 such that the stator 18 and the motor housing 14 may be a composite-like structure. That is, after assembly, the motor housing 14, tunable insert ring 26, and stator 18 may form a composite structure.

More specifically, as best shown in FIG. 3, the tunable insert ring 26 encircles the external surface 20 and includes a plurality of projections 32 each extending towards and disposed in contact with the stator 18 to thereby stiffen the electromagnetic machine 12 and minimize vibration of the stator 18 within the motor housing 14. That is, the plurality of projections 32 may enable optimized spring connections between the stator 18 and the motor housing 14. Each of the plurality of projections 32 may function as a spring and may have a location 28 on the tunable insert ring 26 and a spring rate 30. That is, at least one of the spring rate 30 and the location 28 may be tunable or selectable to thereby reduce vibration of the stator 18 within the motor housing 14. As such, the spring nature of the plurality of projections 32 may enable and allow for required component tolerances while minimizing efficiency loss of the electromagnetic machine 12 due to stresses on the lamination steel of the stator 18. The tunable insert ring 26 and plurality of projections 32 may be formed from a material such as steel. Further, the tunable insert ring 26 may include any number of projections 32 and a geometry of the plurality of projections 32 may vary in shape, height, location, configuration, and/or thickness to provide desirable features including the spring rate 30 as set forth in more detail below. That is, a design and operating characteristics, e.g., spring rate and stiffness, of the tunable insert ring 26 may be tuned or selected according to operating parameters of the electromagnetic machine 12.

Figure 2A:
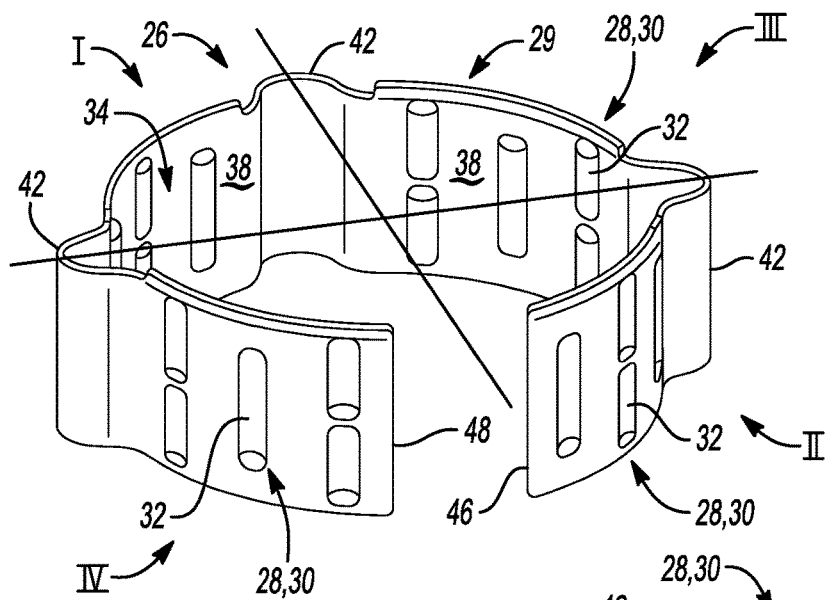
FIG. 2A is a schematic illustration of a perspective view of the tunable insert ring of FIG. 1.
Figure 2B:
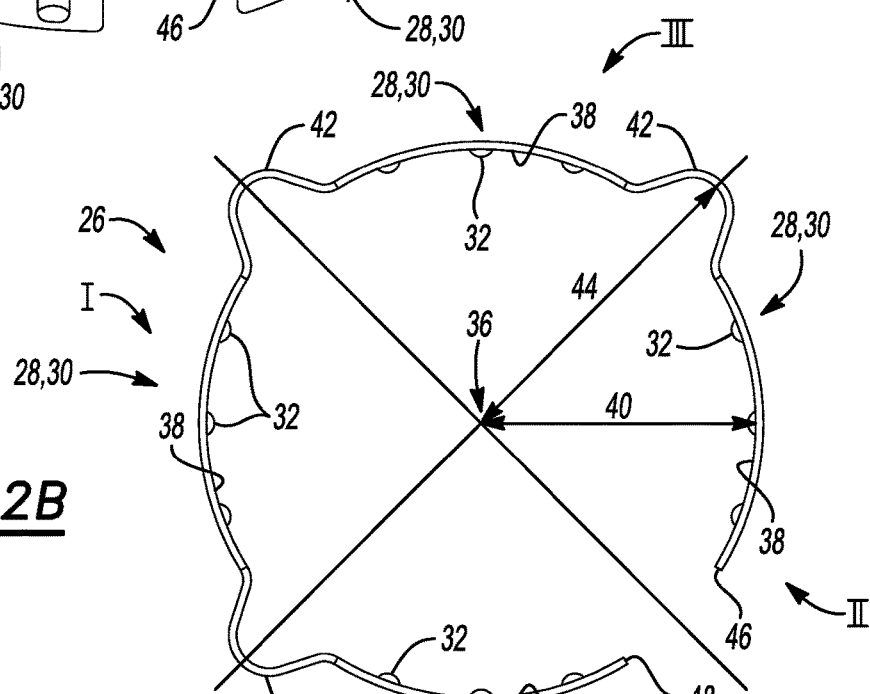
FIG. 2B is a schematic illustration of a top view of the tunable insert ring of FIGS. 1 and 2A.

For example, as best shown in FIGS. 2A and 2B, the tunable insert ring 26 may have four quadrants I, II, III, IV. Each of the four quadrants I, II, III, IV may include at least one of the plurality of projections 32. That is, the plurality of projections 32 may be spaced apart from one another along a perimeter of the tunable insert ring 26.

Figure 2C:
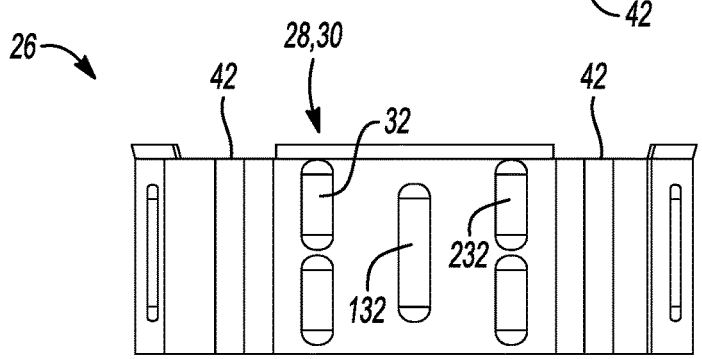
FIG. 2C is a schematic illustration of a side view of the tunable insert ring of FIGS. 1-2B.

Further, in one embodiment, at least one of the four quadrants I, II, III, IV may include at least four projections 32. For example, a first quadrant I and a second quadrant II may each include four projections 32. Referring to FIG. 2A, the four projections 32 may be arranged in a diamond shape. Similarly, a third quadrant III and a fourth quadrant IV may each include five projections 32. Referring to FIG. 2C, the five projections 32 may be arranged in an X shape. Further, although not shown, the projections 32 may be arranged in any shape. In addition, in a single one or in multiple ones of quadrants I, II, III, IV, a first projection 132 may be larger than a second projection 232. That is, the plurality of projections 32 may have different sizes, thicknesses, shapes, and/or locations. As such, the spring rate 30 and location 28 for each projection 32 or the overall plurality of projections 32 may be selectable and tunable for optimized performance and minimized noise, vibration, and harshness of the electromagnetic machine 12 during operation.

The tunable insert ring 26 may contact the motor housing 14 and the stator 18 with an interference fit or friction fit. That is, the tunable insert ring 26 may be press fit between the motor housing 14 and the stator 18 such that an external dimension of the stator 18 is slightly larger than an external dimension of the cavity 16. In addition, as shown in FIG. 2A, the tunable insert ring 26 may include a leading edge or flange 29 that may be chamfered or angled to aid in assembly of the electromagnetic machine 12. That is, the leading edge or flange 29 may be configured to aid or guide insertion of the stator 18. Conversely, the tunable insert ring 26 may not be disposed between the motor housing 14 and the stator 18 with a shrink fit. As such, the electromagnetic machine 12 may minimize metal shavings, debris, and mis-fitting components during assembly of the stator 18 within the motor housing 14. Similarly, the tunable insert ring 26 may not be disposed between the motor housing and the stator 18 with resin bonding. That is, the electromagnetic machine 12 may be free from resin disposed between the stator 18 and the motor housing 14, i.e., between the stator 18 and the tunable insert ring 26 and between the tunable insert ring 26 and the motor housing 14.

Referring now to FIG. 3, the tunable insert ring 26 and the stator 18 define at least one cooling channel 34 therebetween. For example, referring to FIG. 2A, two adjacent projections 32 may define the at least one cooling channel 34 between each other and between the external surface 20 of the stator 18 and the contact surface 38 of the tunable insert ring 26. In another non-limiting example described with reference to FIG. 3, each of the plurality of protrusions 42 may surround a respective one of the plurality of mounting ears 22 to define the at least one cooling channel 34 therebetween. For example, for the embodiment including four mounting ears 22, the tunable insert ring 26 surrounds the four mounting ears 22 to define the plurality of cooling channels 34 therebetween. That is, the tunable insert ring 26 may define a gap or space, i.e., the plurality of cooling channels 34, between one another, at each of the plurality of mounting ears 22, and/or between a first end 46 (FIG. 2A) and a second end 48 (FIG. 2A) as set forth in more detail below. The at least one cooling channel 34, e.g., the plurality of cooling channels 34, may be useful for transmitting cooling fluid to the external surface 20 of the stator 18. That is, for example, water, air, or oil may pass through the plurality of cooling channels 34 to remove heat from a perimeter of the stator 18 and conduct heat to the motor housing 14. Alternatively, for embodiments that do not include a cooling fluid, contact between the plurality of projections 32 and the stator 18 may dissipate thermal energy from the stator 18 to the motor housing 14 via conduction.

More specifically, as described in more detail with reference to FIG. 2B, the tunable insert ring 26 may have a center 36 and a contact surface 38 spaced apart from the center 36 at a first distance 40 and configured for contacting the external surface 20. That is, when assembled, the contact surface 38 may hug or be disposed adjacent to the external surface 20 of the stator 18. In addition, the tunable insert ring 26 may have a plurality of protrusions 42 each configured for surrounding a respective one of the plurality of mounting ears 22. Each of the plurality of protrusions 42 may be spaced apart from the center 36 at a second distance 44 that is greater than the first distance 40. As such, a shape of each of the plurality of protrusions 42 may mimic or follow a shape of each of the plurality of mounting ears 22 so that each of the plurality of protrusions 42 may surround a respective one of the plurality of mounting ears 22 to thereby define the plurality of cooling channels 34.

The tunable insert ring 26 may include any number of protrusions 42. However, in one embodiment, as described with reference to the four quadrants I, II, III, IV shown in FIG. 2B, in one embodiment, each of the plurality of protrusions 42 may straddle two of the four quadrants I, II, III, IV. For example, each of the plurality of protrusions 42 may be disposed along a boundary between two of the four quadrants I, II, III, IV. Further, the electromagnetic machine 12 may include three protrusions 42 and four mounting ears 22.

In addition, the tunable insert ring 26 may further include the first end 46 disposed in the second quadrant II, and the second end 48 spaced apart from the first end 46 and disposed in the fourth quadrant IV. The first end 46 and the second end 48 may also aid in assembly of the electromagnetic machine 12. That is, since the first end 46 may be spaced apart from the second end 48 such that the tunable insert ring 26 is not a complete circle and remains flexible during assembly, the tunable insert ring 26 may be easily and accurately inserted between the motor housing 14 and the stator 18 to form the electromagnetic machine 12. Stated differently, the first end 46 spaced apart from the second end 48 may enhance alignment for assembly. In addition, as best shown in FIG. 3, the first end 46 spaced apart from the second end 48 may define the at least one cooling channel 34 therebetween, which may further enhance cooling of the stator 18 during operation.

Therefore, in summary, for this embodiment, the tunable insert ring 26 includes three protrusions 42 each configured for surrounding a respective one of three of the four mounting ears 22. Each of the three protrusions 42 is spaced apart from the center 36 at the second distance 44 that is greater than the first distance 40. The tunable insert ring 26 has the first end 46 disposed in the second quadrant II and the second end 48 spaced apart from the first end 46 and disposed in the fourth quadrant IV. Further, the first quadrant I and the second quadrant II spaced opposite the first quadrant I each include four projections 32 arranged in a diamond shape. The third quadrant III and the fourth quadrant IV each include five projections 32 arranged in an X shape. In addition, the tunable insert ring 26 encircles the external surface 20 and includes the plurality of projections 32 each extending towards and disposed in contact with the motor housing 14 to thereby stiffen the electromagnetic machine 12 and minimize vibration of the stator 18 within the motor housing 14.

Figure 4:
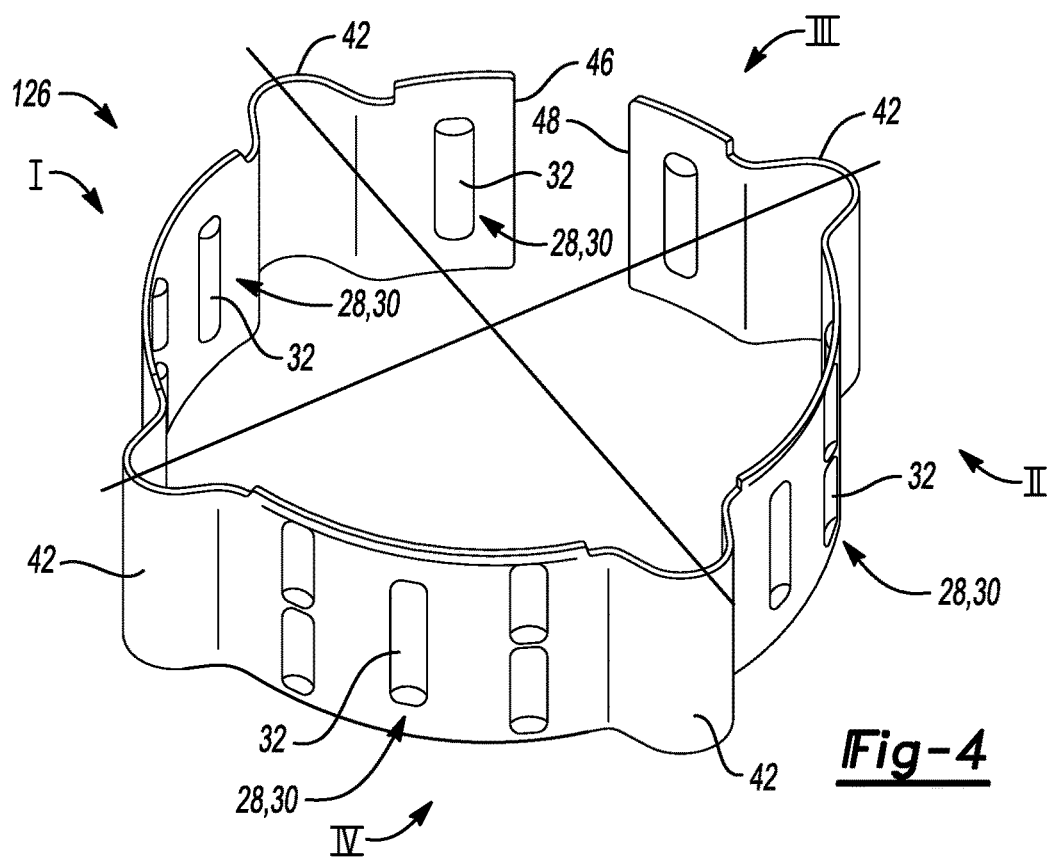
FIG. 4 is a schematic illustration of a perspective view of another embodiment of the tunable insert ring of FIG. 1.

Alternatively, in another embodiment described with reference to FIG. 4, the tunable insert ring 126 may include four protrusions 42. In addition, the tunable insert ring 126 may have the first end 46 disposed in the third quadrant III and the second end 48 spaced apart from the first end 46 and also disposed in the third quadrant III. That is, the first end 46 and the second end 48 may be disposed in the same quadrant III.

Referring again to FIG. 1, the device 10 includes a driven component 50 and an output member 52 configured for driving the driven component 50. Further, the electromagnetic machine 12 may be coupled to the driven component 50. That is, the electromagnetic machine 12 may provide power to the driven component 50 through the output member 52. For example, for vehicular applications, the driven component 50 may be a driveshaft, a transmission linkage, or a plurality of wheels. Further, the output member 52 may be a rotor (shown generally in FIG. 1) concentric with the stator 18 and disposed within a second cavity 116 defined by the stator 18. During operation, the rotor or output member 52 may rotate within the second cavity 116 to thereby generate electric current, which may in turn drive the driven component 50. As such, the stator 18 may be concentric with the output member 52 and may not vibrate unnecessarily during operation. That is, the tunable insert ring 26 may provide a tunable interference fit in which the plurality of projections 32 act like springs to absorb and dampen vibration, noise, and harshness of the rotating output member 52 and static stator 18 within the motor housing 14. That is, the tunable insert ring 26 may increase motor housing-to-stator stiffness, increase concentricity of the stator 18, and decrease an airgap (not shown) between the stator 18 and the output member 52.

Therefore, the device 10 and electromagnetic machine 12 may be useful for applications requiring excellent efficiency and minimal noise, vibration, and harshness during operation. In particular, the electromagnetic machine 12 may have excellent stiffness and therefore may not suffer from low-frequency whine and/or efficiency losses during operation. Therefore, the electromagnetic machine 12 and device 10 may be economical in terms of manufacturing time and cost, may be scalable to mass production manufacturing operations, and may eliminate manufacturing steps such as shrink-fitting and resin-bonding of components. That is, the tunable insert ring 26 may decrease capital expenses by replacing expensive and comparatively high cycle time heat shrink processes for assembly of the stator 18 within the motor housing 14, which may therefore eliminate heating and cooling assembly equipment.

While the best modes for carrying out the disclosure have been described in detail, those familiar with the art to which this disclosure relates will recognize various alternative designs and embodiments for practicing the disclosure within the scope of the appended claims.

What is claimed is:

1. An electromagnetic machine comprising:
   a motor housing defining a cavity therein;
   a stator disposed within the cavity and having an external surface and a plurality of mounting ears each configured to receive a fastener and extending from the external surface towards the motor housing; and
   a tunable insert ring disposed between the motor housing and the stator;
   wherein the tunable insert ring and the stator define at least one cooling channel therebetween;
   wherein the tunable insert ring encircles the external surface and includes a plurality of projections each extending towards and disposed in contact with the stator to thereby stiffen the electromagnetic machine and minimize vibration of the stator within the motor housing.

2. The electromagnetic machine of claim 1, wherein each of the plurality of projections has a location on the tunable insert ring and a spring rate, and further wherein at least one of the spring rate and the location is tunable to thereby reduce vibration of the stator within the motor housing.

3. The electromagnetic machine of claim 1, wherein the tunable insert ring contacts the motor housing and the stator with an interference fit.

4. The electromagnetic machine of claim 1, wherein the tunable insert ring has:
   four quadrants;
   a center;
   a contact surface spaced apart from the center at a first distance and configured for contacting the external surface; and
   a plurality of protrusions each configured for surrounding a respective one of the plurality of mounting ears;
   wherein each of the plurality of protrusions is spaced apart from the center at a second distance that is greater than the first distance.

5. The electromagnetic machine of claim 4, wherein each of the plurality of protrusions surrounds a respective one of the plurality of mounting ears to define the at least one cooling channel therebetween.

6. The electromagnetic machine of claim 4, wherein each of the plurality of protrusions straddles two of the four quadrants.

7. The electromagnetic machine of claim 4, wherein the electromagnetic machine includes three protrusions and four mounting ears.

8. The electromagnetic machine of claim 4, wherein the tunable insert ring further includes:
   a first end disposed in a second quadrant; and
   a second end spaced apart from the first end and disposed in a fourth quadrant.

9. The electromagnetic machine of claim 4, wherein the tunable insert ring includes four protrusions.

10. The electromagnetic machine of claim 9, wherein the tunable insert ring has a first end disposed in a third quadrant and a second end spaced apart from the first end and also disposed in the third quadrant.

11. The electromagnetic machine of claim 4, wherein each of the four quadrants includes at least one of the plurality of projections.

12. The electromagnetic machine of claim 4, wherein at least one of the four quadrants includes at least four projections.

13. The electromagnetic machine of claim 11, wherein a first projection is larger than a second projection.

14. The electromagnetic machine of claim 11, wherein a first quadrant and a second quadrant each include four projections.

15. The electromagnetic machine of claim 14, wherein the four projections are arranged in a diamond shape.

16. The electromagnetic machine of claim 13, wherein a third quadrant and a fourth quadrant each include five projections.

17. The electromagnetic machine of claim 16, wherein the five projections are arranged in an X shape.

18. An electromagnetic machine comprising:
   a motor housing defining a cavity therein;
   a stator disposed within the cavity and having an external surface and four mounting ears each configured to receive a fastener and extending from the external surface towards the motor housing; and
   a tunable insert ring disposed between the motor housing and the stator and including:
      four quadrants;
      a center;
      a contact surface spaced apart from the center at a first distance and configured for contacting the external surface; and
      three protrusions each configured for surrounding a respective one of three of the four mounting ears;
      wherein each of the three protrusions is spaced apart from the center at a second distance that is greater than the first distance;
      wherein the tunable insert ring has a first end disposed in a second quadrant and a second end spaced apart from the first end and disposed in a fourth quadrant;

wherein the tunable insert ring surrounds the four mounting ears to define a plurality of cooling channels therebetween;

wherein the tunable insert ring encircles the external surface and includes a plurality of projections each extending towards and disposed in contact with the stator to thereby stiffen the electromagnetic machine and minimize vibration of the stator within the motor housing; and wherein:
- a first quadrant and the second quadrant spaced opposite the first quadrant each include four projections arranged in a diamond shape; and
- a third quadrant and the fourth quadrant spaced opposite the third quadrant each include five projections arranged in an X shape.

19. A device comprising:

a driven component;

an electromagnetic machine coupled to the driven component and including:

- a motor housing defining a cavity therein;
- a stator disposed within the cavity and having an external surface and a plurality of mounting ears each configured to receive a fastener and extending from the external surface towards the motor housing; and
- a tunable insert ring disposed between the motor housing and the stator;

wherein the tunable insert ring and the stator define at least one cooling channel therebetween;

wherein the tunable insert ring encircles the external surface and includes a plurality of projections each extending towards and disposed in contact with the stator to thereby stiffen the electromagnetic machine and minimize vibration of the stator within the motor housing; and an output member disposed within a second cavity defined by the stator and configured for driving the driven component.

20. The device of claim 19, wherein the stator is concentric with the output member.

* * * * *